(12) United States Patent
Towers et al.

(10) Patent No.: US 6,837,407 B1
(45) Date of Patent: Jan. 4, 2005

(54) STORAGE CONTAINER INTENDED FOR PLACEMENT INTO STANDARD WATER BOTTLE HOLDERS OFTEN FOUND ON BICYCLES

(76) Inventors: Christopher R Towers, 540 N. 66th St., Seattle, WA (US) 98103; William P. Stiles, 927 Duchess Rd., Bothell, WA (US) 98012

( * ) Notice: Subject to any disclaimer, the term of this patent is extended or adjusted under 35 U.S.C. 154(b) by 43 days.

(21) Appl. No.: 10/304,993

(22) Filed: Nov. 25, 2002

(51) Int. Cl.$^7$ .................. B62J 9/00; B62J 11/00
(52) U.S. Cl. ............... 224/424; 224/425; 224/435; 220/840
(58) Field of Search ............... 224/419, 424, 224/425, 431, 433, 435, 440, 929, 457, 459, 547; 206/701, 349, 372, 373, 591; 220/840

(56) References Cited

U.S. PATENT DOCUMENTS

| | | | | |
|---|---|---|---|---|
| 4,071,065 A | * | 1/1978 | Halbich | 206/591 |
| 4,193,525 A | * | 3/1980 | Sommers | 224/435 |
| 4,469,345 A | | 9/1984 | Weiss | |
| 4,666,068 A | * | 5/1987 | Bush | 220/840 |
| 4,696,401 A | * | 9/1987 | Wallace | 206/591 |
| 4,742,928 A | * | 5/1988 | Braun | 220/840 |
| 4,809,890 A | | 3/1989 | Tsigadas | |
| 4,878,642 A | | 11/1989 | Kirby, Jr. | |
| 4,967,435 A | | 11/1990 | Seals | |
| 5,178,308 A | | 1/1993 | Endre | |
| 5,597,225 A | | 1/1997 | Davis | |
| 5,628,440 A | | 5/1997 | Gallazzini | |
| 6,059,245 A | | 5/2000 | Hermansen | |
| 6,092,707 A | | 7/2000 | Bowes | |
| 6,427,890 B1 | | 8/2002 | Meng | |

FOREIGN PATENT DOCUMENTS

| | | | |
|---|---|---|---|
| DE | 19541612 | * | 5/1997 |
| EP | 990580 | * | 4/1999 |
| EP | 990580 | * | 4/2000 |

* cited by examiner

*Primary Examiner*—Nathan J. Newhouse

(57) ABSTRACT

A storage container intended for placement into standard water bottle holders often found on bicycles. The container has a door, which can be rotated open on a hinge. This can be done without removing the container from the water bottle holder. The container has a retention feature for keeping the door closed. The container provides the user with a storage space for such articles including, but not limited to sunglasses, personal identification, emergency information, money, credit cards, patch kits, tools, writing tools, computers, cell phones, food and first aid kits. The container's shape properly orients the container in the water bottle holder and prevents the container from rotating axially in the water bottle holder or from falling out under vibration. The container may be locked closed and may also be locked to the bottle holder. The container's shape is such that it can stand vertically or horizontally, opened or closed on a flat surface, such as the ground or a tabletop.

18 Claims, 17 Drawing Sheets

STORAGE CONTAINER INTENDED FOR PLACEMENT INTO STANDARD WATER BOTTLE HOLDERS OFTEN FOUND ON BICYCLES

CROSS-REFERENCE RELATED APPLICATIONS

Not Applicable

FEDERALLY SPONSORED RESEARCH

Not Applicable

SEQUENCE LISTING OR PROGRAM

Not Applicable

BACKGROUND OF INVENTION

1. Field of Invention

This invention is related to containers, and more particularly, to containers which may be carried in the standard water bottle holders often found on bicycles or other types of sporting equipment.

2. Background of the Invention

The water bottle holder is a standard component, which can be found at most retail locations where bicycles and biking accessories are sold. Most new bicycles have two locations for mounting water bottle holders. With the emergence of backpack type hydration systems, many bicyclists no longer place water bottles in their holders. Other cyclists may choose to carry just one bottle at a time. The commuter bicyclist may not carry any water bottles at all.

There are many items a bicyclist may want to have easy access to, but may not want to carry on his or her body while riding. These items include sunglasses, personal identification, emergency information, money, credit cards, patch kits, tools, writing tools, computers, cell phones, food and first aid kits.

High performance racing bicyclists require on-bicycle accessory options that are lightweight and unobtrusive. Technical mountain bicyclists require on-bicycle accessory options that are rugged and can withstand high vibration environments.

There are a number of on-bicycle storage options available to cyclists such as saddlebags, and under-seat bags. The bicyclist cannot easily access these types of storage devices without completely dismounting the bicycle. Many on-bicycle storage options require the use of special mounting brackets and cannot be easily removed from the bicycle between uses. Many of these options are large and obtrusive. Some canvas bags are not at all waterproof.

A few non-liquid storage containers intended for placement into standard water bottle holders have been proposed. For example, the U.S. Pat. No. 5,178,308 to Endre discloses a curved food container. This container includes a closure which covers the mouth of the container and is secured to the container by a tether. Although the tether effectively secures the closure to the disclosed container, the closure is still free to flop around when the container is open. The closure could potentially be struck by the cyclists legs. It could also interfere with the moving parts on the bicycle including the pedals, chain rings, or wheels. The curved container provides no means for splitting the main hollow body in order to access the articles which may be lodged in the bottom of the container. It also has no means for fixing specific articles to the container. Thus the articles are free to bounce around inside the disclosed container. This may be an audible annoyance to the bicyclist and may also cause damage the stored articles.

Another example of a non-liquid storage container adapted for placement into standard water bottle holders is U.S. Pat. No. 6,092,707 to Bowes. It discloses a protective telephone case composed of two separate halves which when mated together form a hollow cylinder with capped ends. The Bowes device cannot be fully opened unless it is removed from the water bottle holder. Because of it's cylindrical shape it would be susceptible to rolling when places on it's side on the ground or a table top. This device has a high part count, and requires numerous assembly processes, making it prohibitively expensive to manufacture.

BACKGROUND OF INVENTION—OBJECTS AND ADVANTAGES

Accordingly, besides the objects and advantages of the container described in our above patent, several objects and advantages of the present invention are:

(a) to provide a lightweight, unobtrusive, waterproof on-bicycle storage container.

(b) to provide an inexpensive, on-bicycle storage container.

(c) to provide a container which can be placed into standard water bottle holder and opened without removal of the container from the holder.

(d) to provide a container which can be easily attached and detached from the bicycle between uses.

(e) to provide a container with a large opening, allowing for easy access to the stored articles.

(f) to provide a container with a hinged door that remains fixed to the main housing;

(g) to provide a container which can be secured to bicycles without the use of any additional mounting brackets other than a standard bottle holder.

(h) to provide a container which is shaped such that it can stand vertically or horizontally, opened or closed on a flat, horizontal surface, such as the ground or a table top.

(i) to provide a container which is shaped such that it can be easily mounted to a vertical surface, such as a wall or a pegboard.

(j) to provide a container with a cross-section which properly orients the container in the bottle holder and prevents the container from rotating axially.

(k) To provide a container which contains internal clips and partitions for retaining the stored articles.

(l) to provide a container which can be locked to a standard bottle holder.

(m) to provide a container which has a door that can be locked closed, securing the articles inside.

Further objects and advantages are to provide a container that can be accessed by the bicyclist without having to completely dismount the bicycle. While straddling the bicycle, the bicyclist can reach down with one hand and open the hinged door. Because of the nature of the hinged door, it can not flap around from left or right relative to the bicycle frame while the door is open. This is advantageous because if the door were to open while the bicyclist was riding, the bicyclist would be less likely to hit the door with his or her legs. The door would not interfere with any of the moving parts on the bicycle including the pedals, chain rings, or wheels. In another embodiment of the invention, the container housing is comprised of two parts, which are mated together to form an enclosed space with an opening. The housing parts can rotate apart from each other on a hinge. This makes the articles in the container more accessible to the user. Still further objects and advantages will become apparent from a consideration of the ensuing description and drawings.

SUMMARY

A storage container intended for placement into standard water bottle holders often found on bicycles. The container door can be rotated open on a hinge without removal of the container from the water bottle holder.

DRAWINGS—FIGURES

FIG. 1 is an isometric view of the storage container in a standard water bottle holder. The water bottle holder is mounted to a bicycle frame. The container door is opened in this view.

FIG. 2 is an isometric view of the storage container in a standard water bottle holder. The water bottle holder is mounted to a bicycle frame. The container door is closed in this view.

Figure 16:
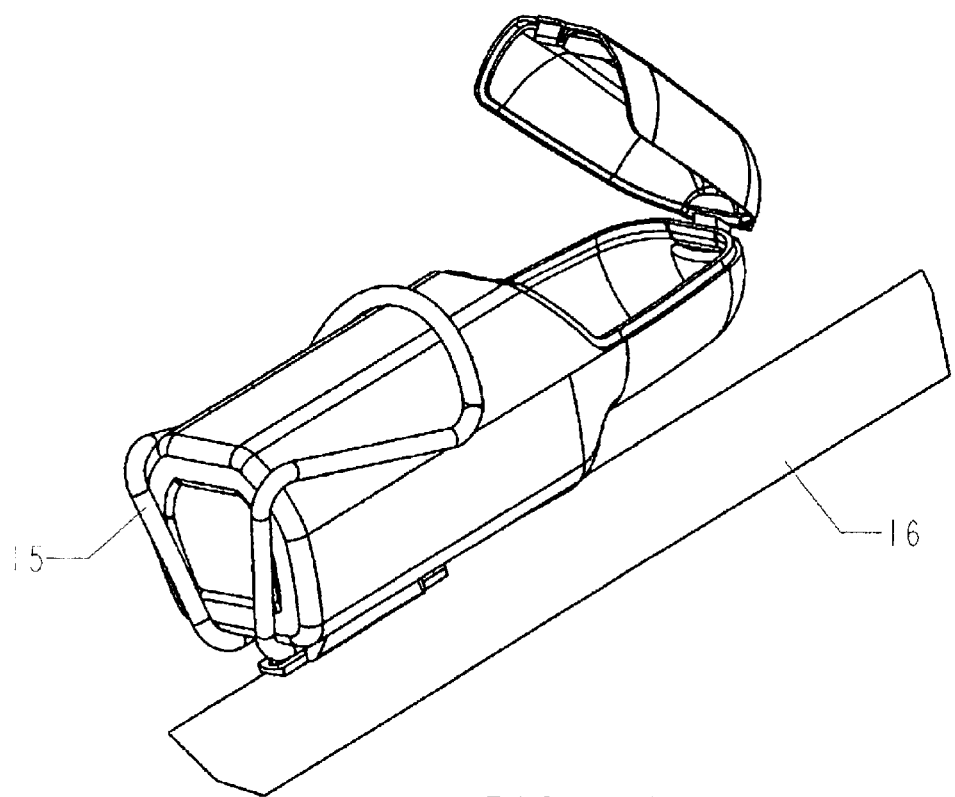

FIG. 16 is isometric view of the storage container in a standard water bottle holder. The water bottle holder is mounted to a bicycle frame. The door hinge and door retention features are in alternative locations than previously shown.

Figure 17:
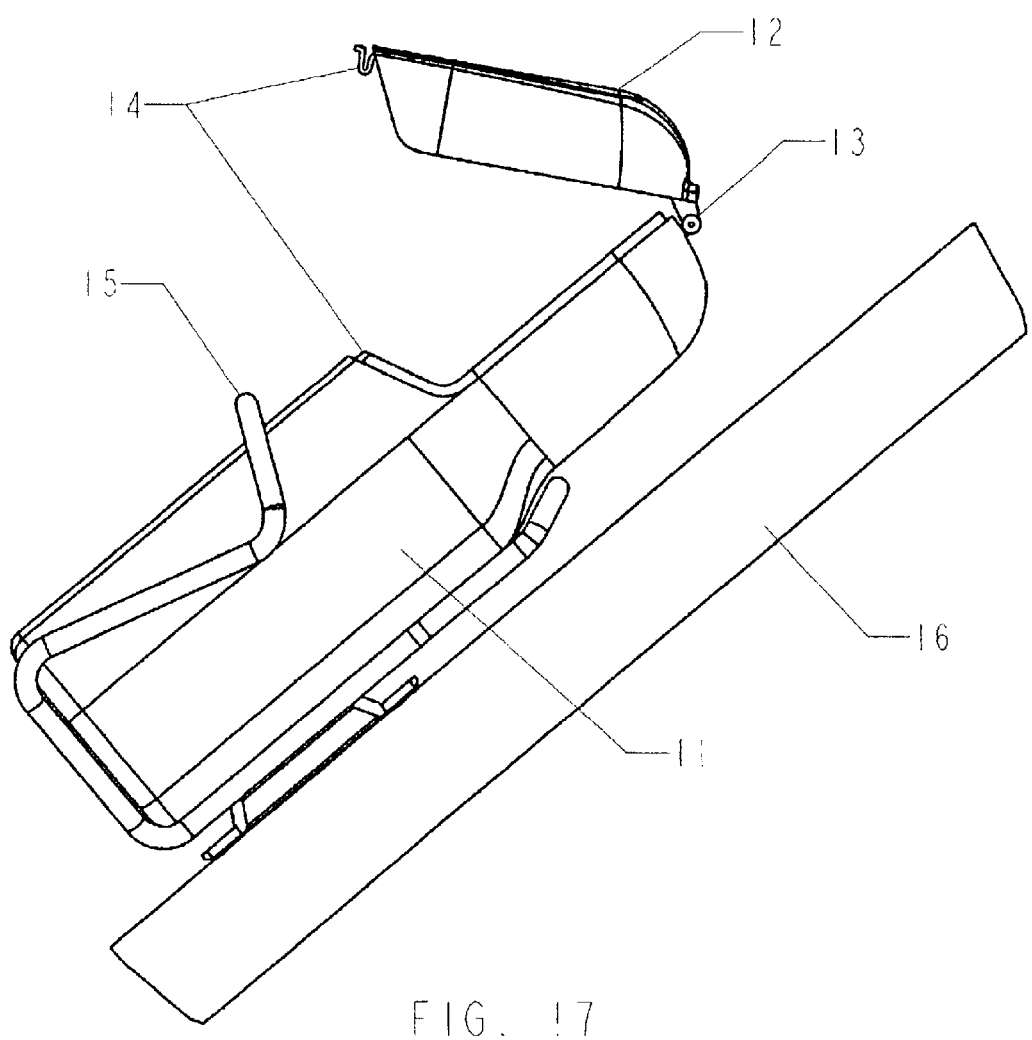

FIG. 17 is a side view of the storage container in a standard water bottle holder. The water bottle holder is mounted to a bicycle frame. The door hinge and retention features are in alternative locations than previously shown.

Figure 18:
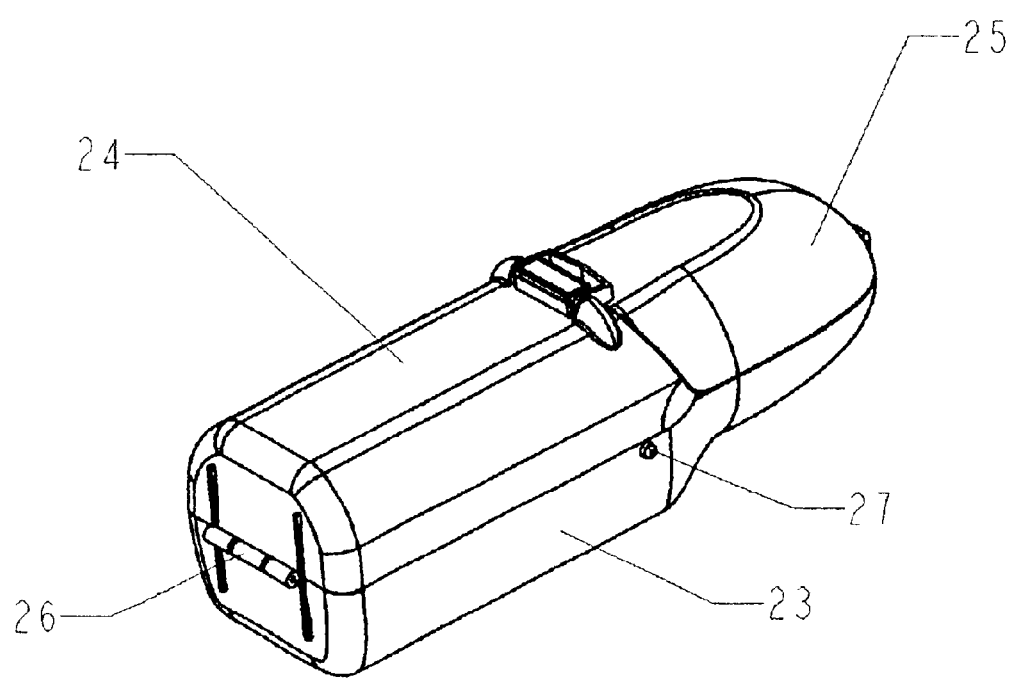

FIG. 18 is an isometric view of the split housing embodiment of the storage container. The container door is closed.

Figure 19:
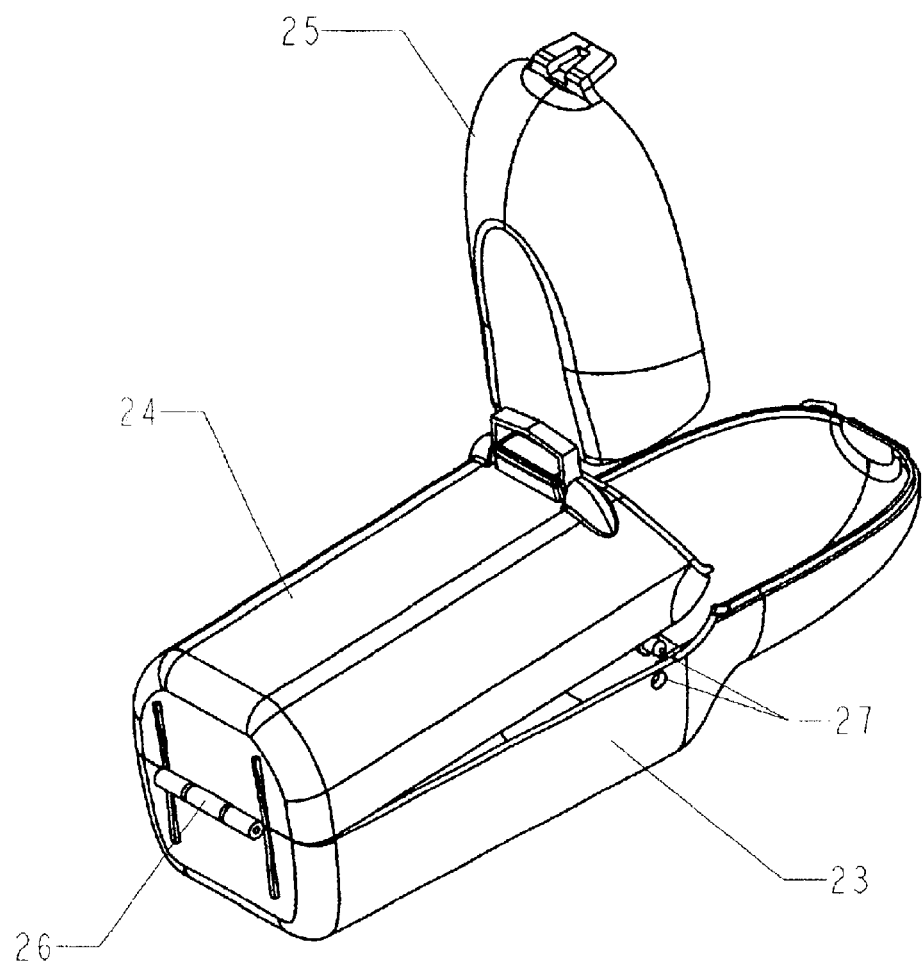

FIG. 19 is an isometric view of the split housing embodiment of the storage container. The container door is open. The container top housing is released from the container bottom housing and is rotated partially open.

Figure 20:
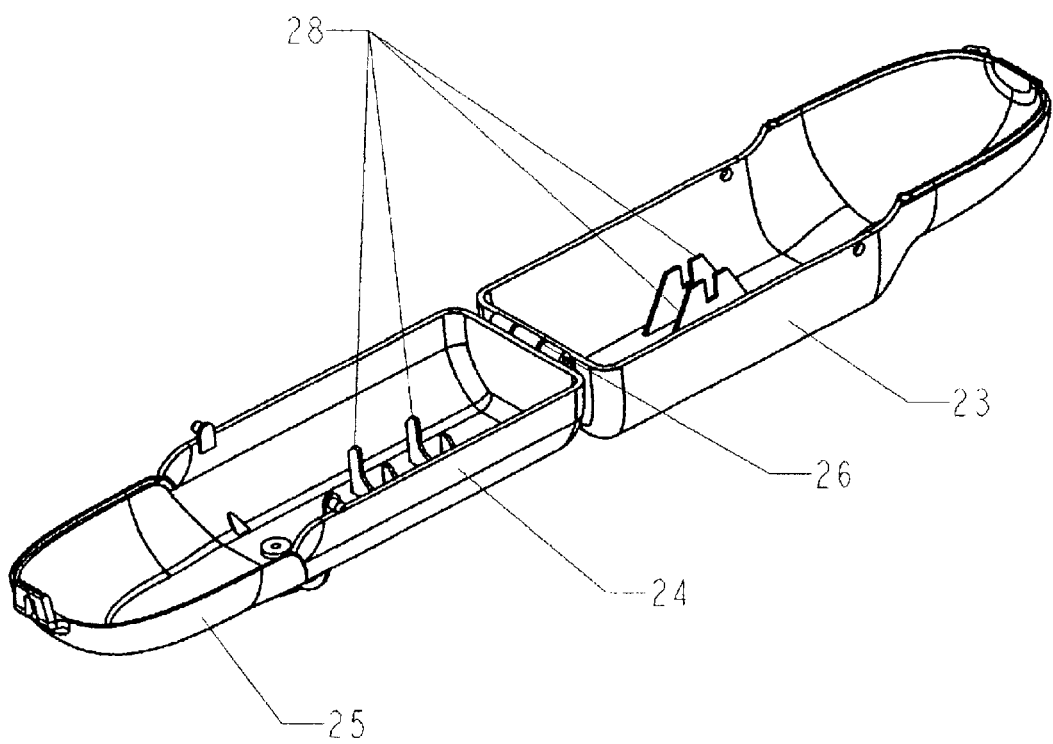

FIG. 20 is an isometric view of the split housing embodiment of the storage container. The container top housing is released from the container bottom housing and is completely open.

Figure 21:
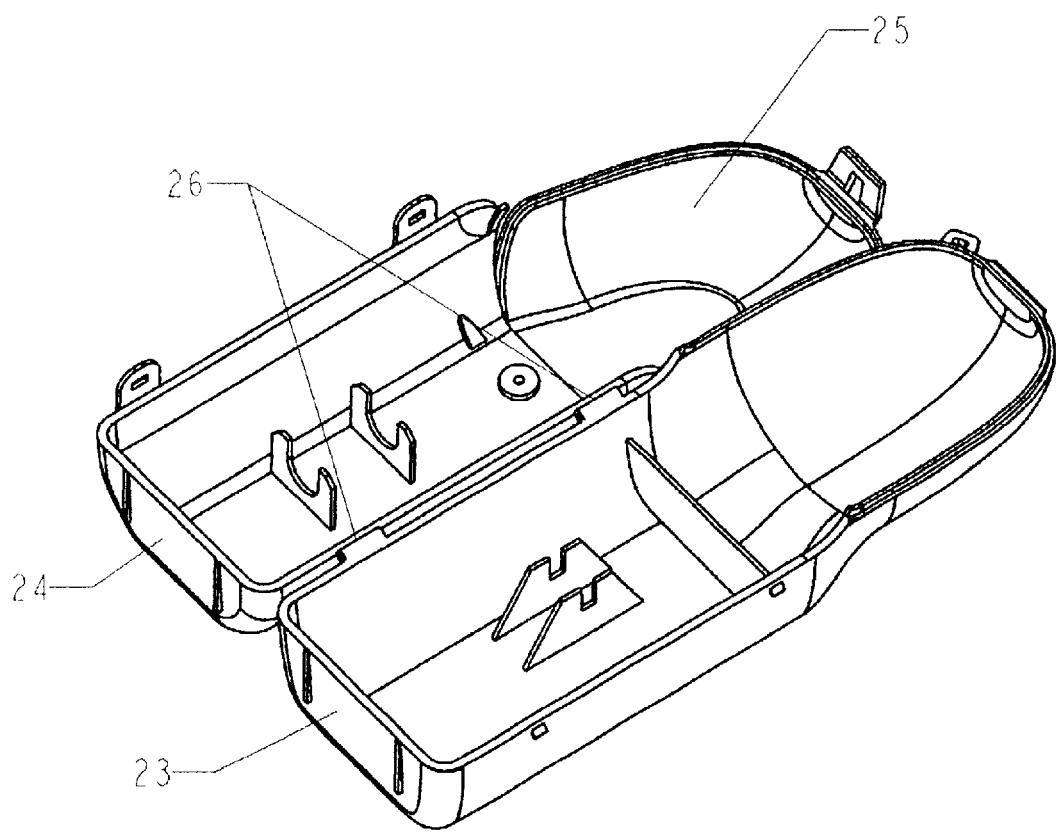
Figure 1:
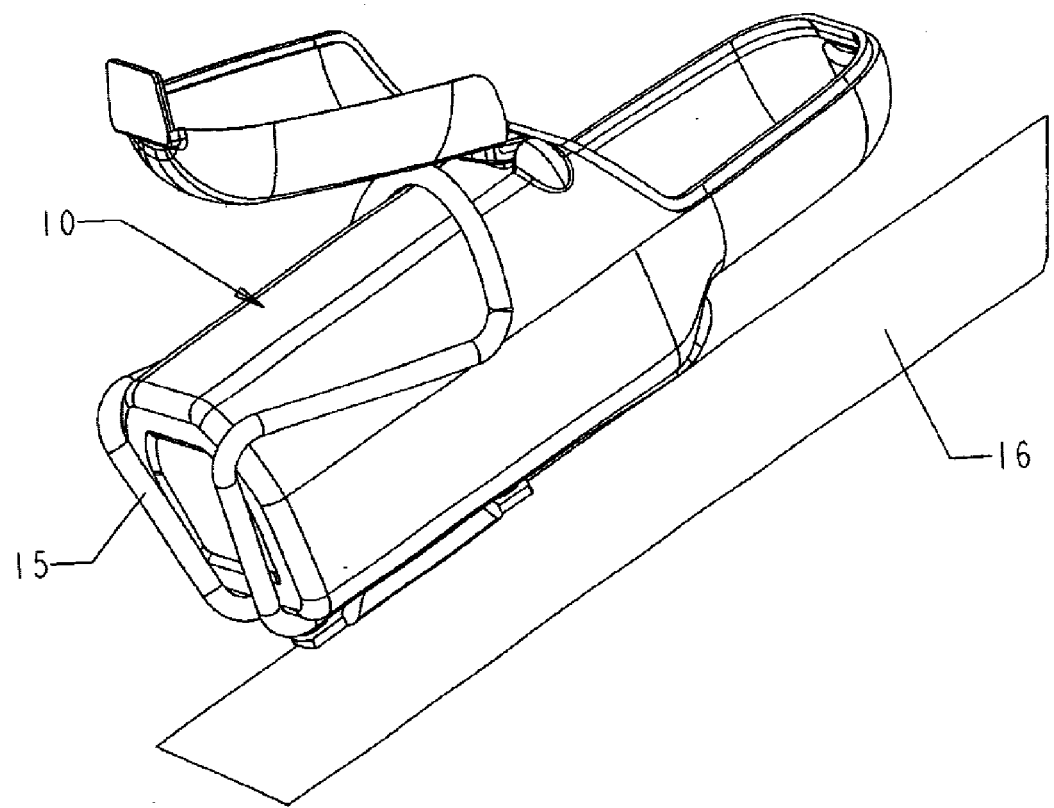
Figure 2:
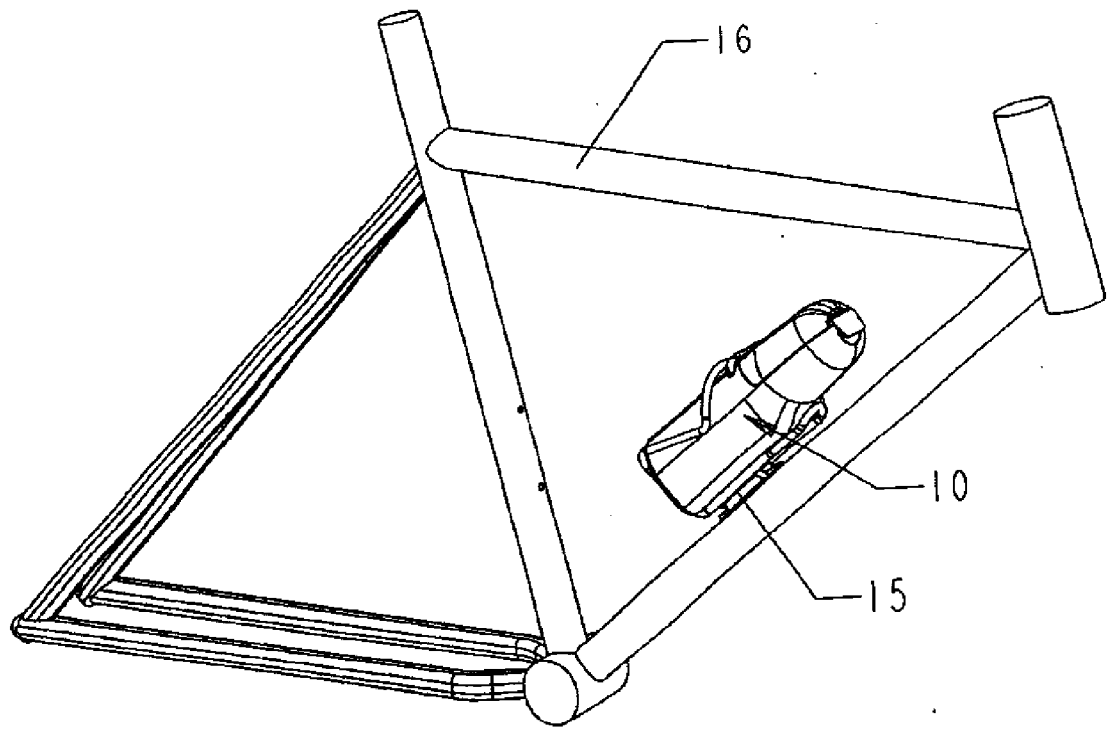
Figure 3:
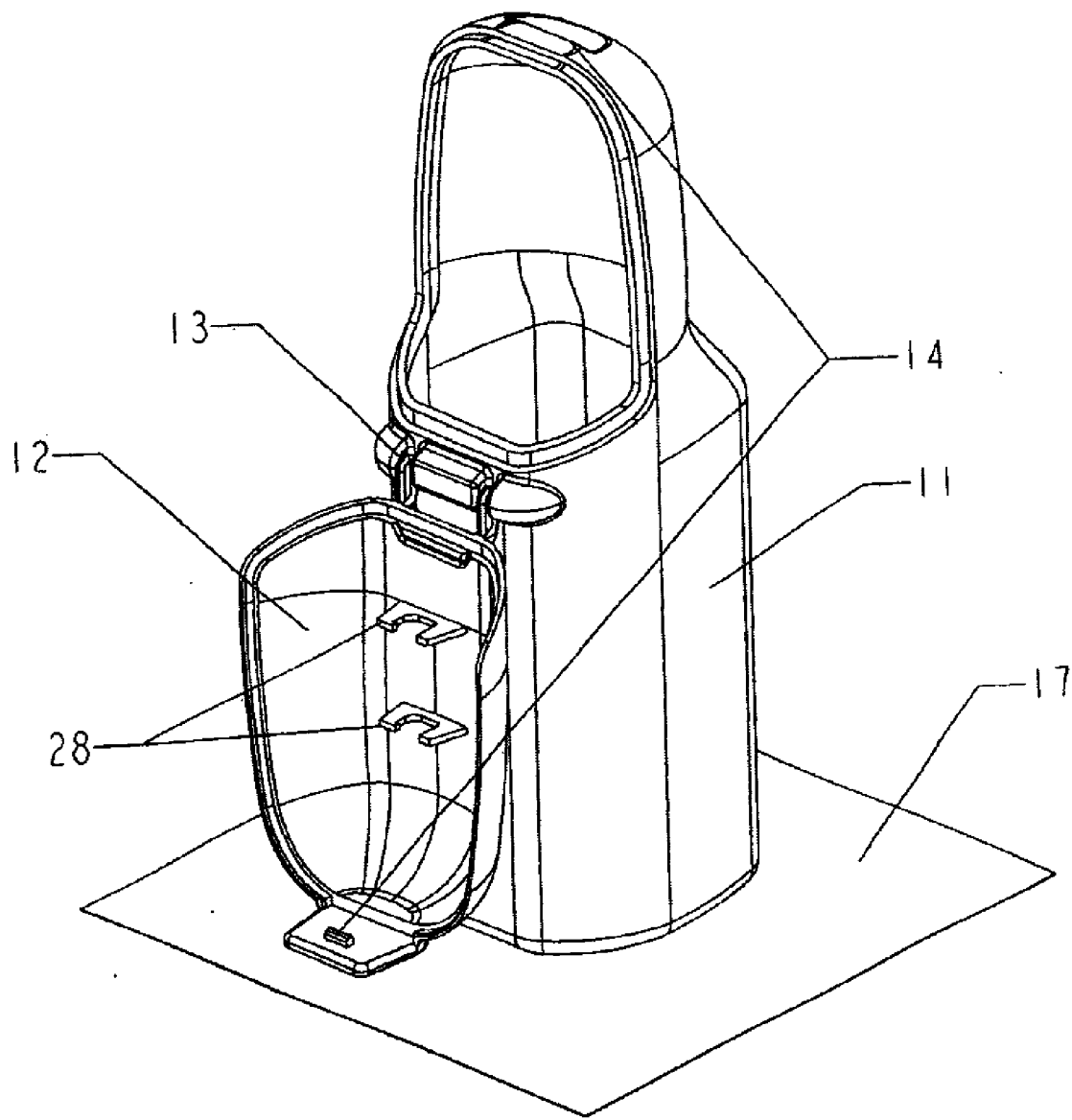

FIG. 21 is an isometric view of the split housing embodiment of the storage container. The housing hinge and housing retention features are in alternative locations than previously shown.

DRAWINGS—REFERENCE NUMERALS

10 Storage Container
11 Container Housing
12 Container Door
13 Door Hinge
14 Door Retention Features
15 Water Bottle Holder
16 Bicycle Frame
17 Table Top or Ground Representation
18 Hinge Dimple
19 Hinge Pin
20 Untrimmed, Blow Molded Housing
21 Trimmed Material
22 Trimming Line
23 Container Bottom Housing-Split Housing Embodiment
24 Container Top Housing-Split Housing Embodiment
25 Container Door-Split Housing Embodiment
26 Housing Hinge-Split Housing Embodiment
27 Housing Retention Features-Split Housing Embodiment
28 Accessory Retention Clips and Partitions
29 Container-To-Bottle-Holder Locking Mechanism
30 Door Locking Mechanism
31 Pegboard

DETAILED DESCRIPTION OF INVENTION

Figure 1:
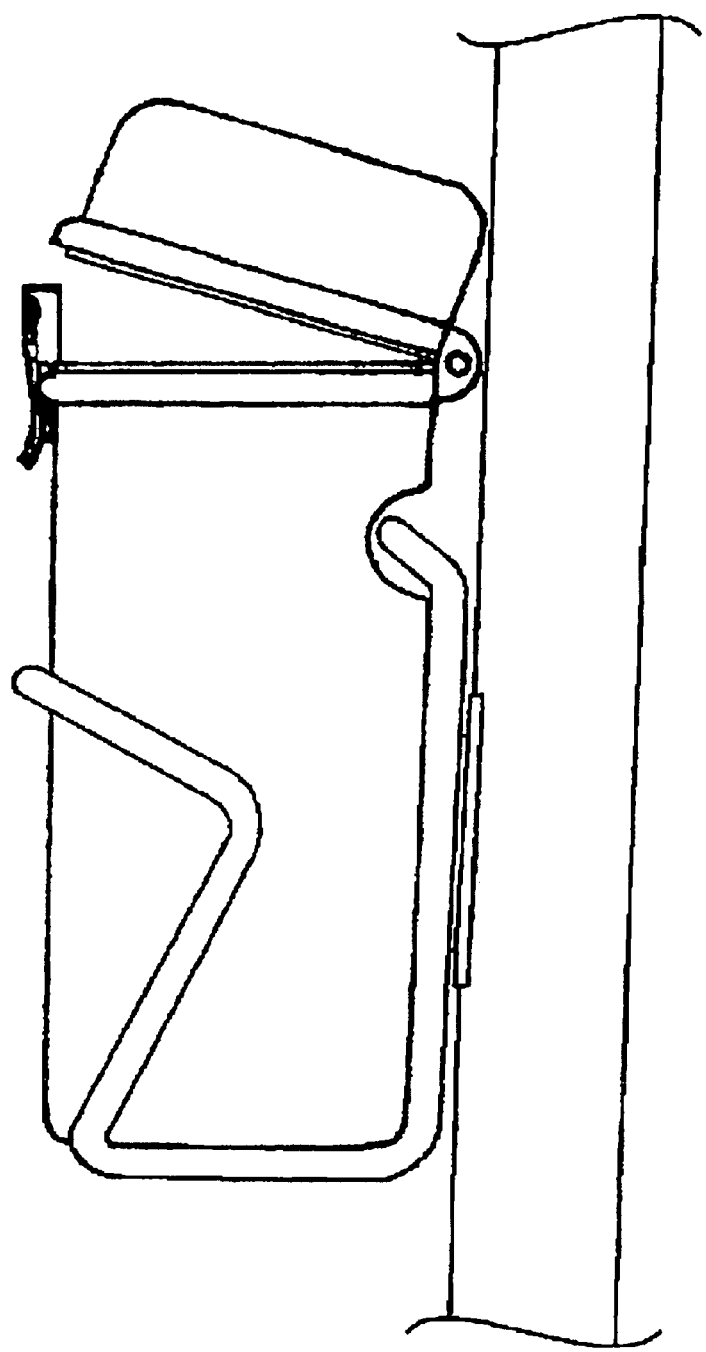
Figure 2:
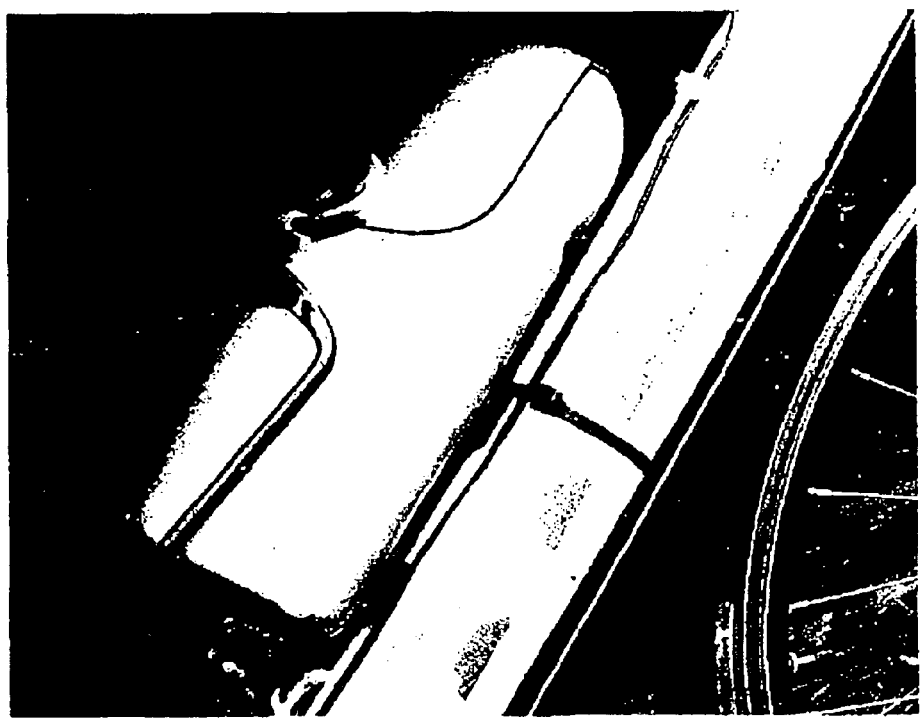

One embodiment of the storage container 10 is illustrated in FIG. 1. The device is intended for storage of items including, but not limited to sunglasses, personal identification, emergency information, money, credit cards, patch kits, tools, writing tools, computers, cell phones, food and first aid kits. One intended application of the device 10 is for use in bicycling. The device 10 fits snuggly into standard water bottle holders 15 often found on bicycles and other types of sporting equipment. In FIG. 1, the container door 12 is open. The wide opening in the container housing 11 allows the user to reach in and access the contents of the container 10. The container 10 does not need to be removed from the holder 15 in order to open the door 12 and access the articles. By utilizing the existing standard bottle holder 15, the user is not required to mount any additional hardware for securing the container 10 to a bicycle or other type of sporting equipment. In FIG. 2, the container door 12 is closed. The container door 12 has surfaces, which mate with the container housing 11 surfaces and form a seal when the door is closed. The water bottle holder 15 is mounted to a bike frame 16.

Figure 3:
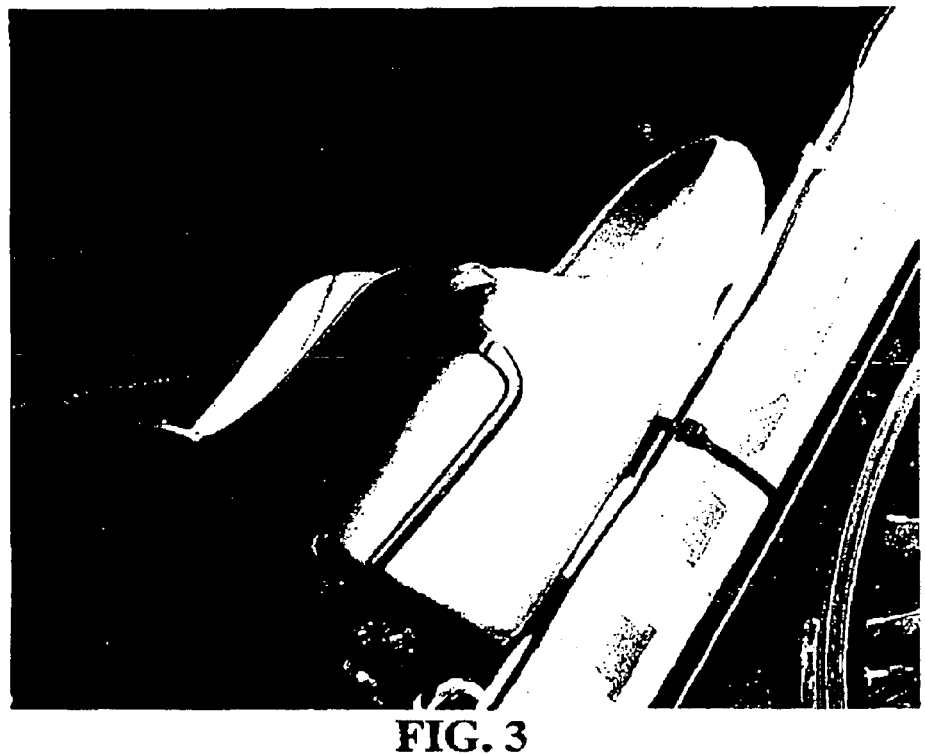
FIG. 3 is an isometric view of the storage container standing vertically on a flat, horizontal surface. The container door is open.
Figure 4:
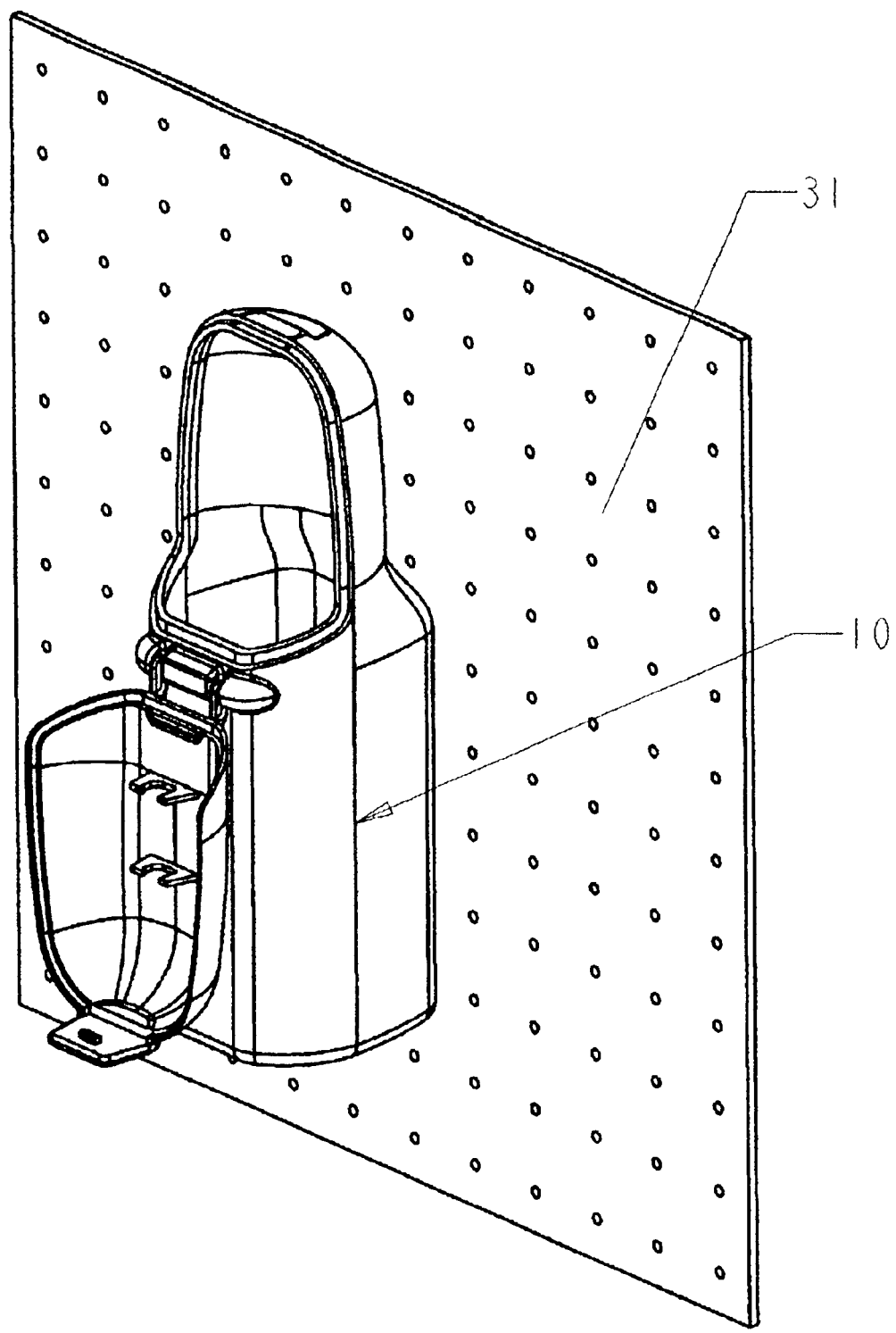
FIG. 4 is an isometric view of the storage container mounted to a pegboard. The container door is open.
Figure 5:
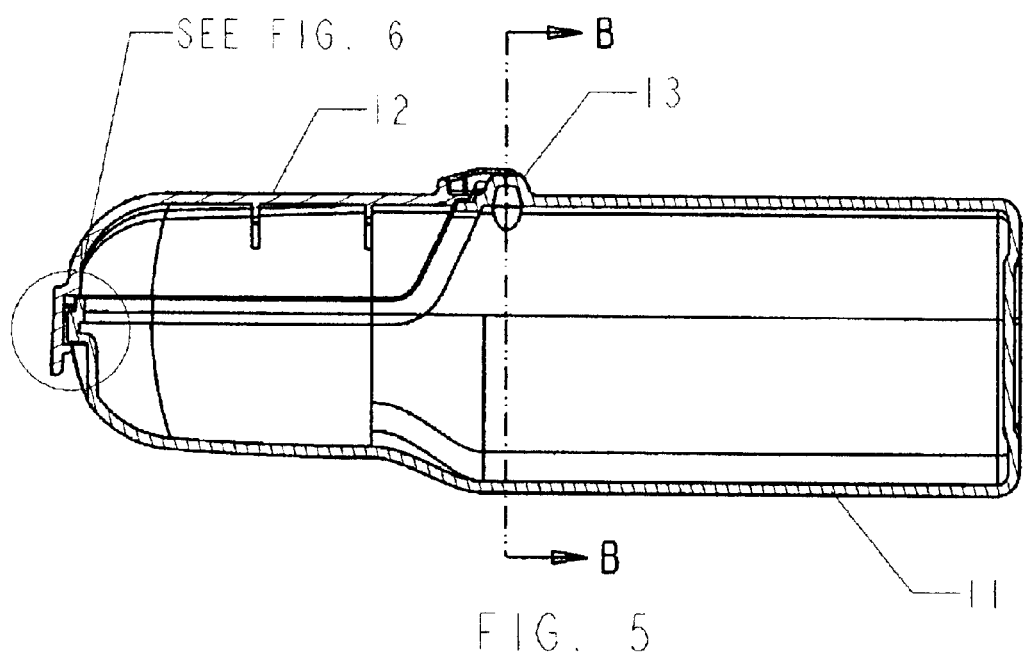
FIG. 5 is a cross-sectional view taken along the line 5—5 of FIG. 7.
Figure 6:
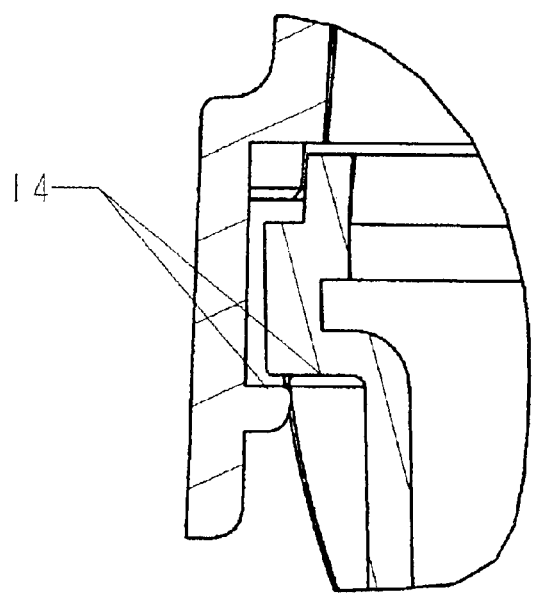
FIG. 6 is a detailed view of FIG. 5.
Figure 7:
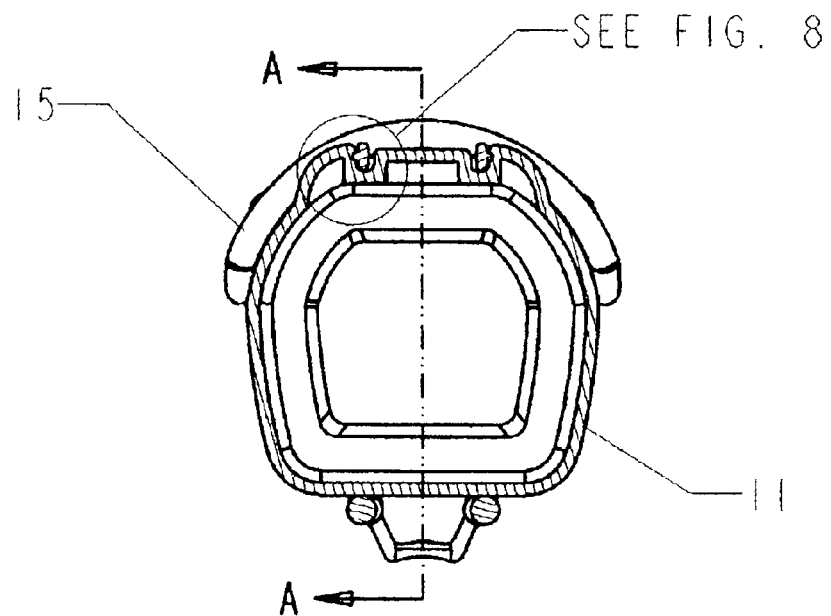
FIG. 7 is a cross-sectional view taken along line 7—7 of FIG. 5.

FIG. 3 illustrates another aspect of the container 10. The container 10 is shaped such that it can stand vertically (as shown) or horizontally, opened or closed on a flat, horizontal surface, such as the ground or a table top 17. The retention features 14 of the container door 12 and container housing 11 keep the door 12 closed, and the articles secure even under high vibration. The user can deflect the retention feature 14 of the door 12 away from the retention features 14 of the housing 11 with their fingers, and rotate the door 12 open on the door hinge 13. FIG. 4 illustrates the container 10 mounted to a pegboard 31. This type of board can often be found above work benches and in utility areas. The housing's 11 flat side provides a good mating surface for mounting the container 10 to a vertical surface or pegboard. The container 10 may be mounted to the vertical surface with glue, fasteners or brackets. In FIG. 6 a cross-section of the retention features 14 are illustrated. FIG. 7 is a cross-section of the container 10. This illustrates how the geometry of the housing 11 properly orients the container 10 in the water bottle holder 15 and prevents the container 10 from rotating axially under vibration.

Figure 8:
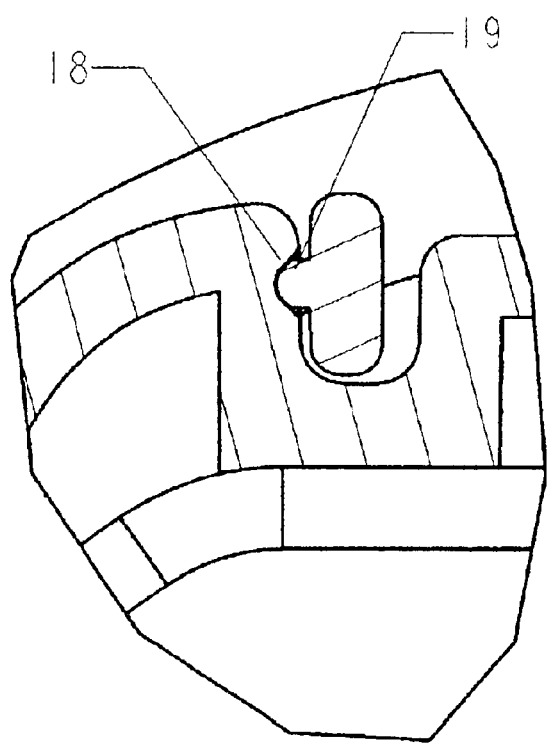
FIG. 8 is a detailed view of FIG. 7.
Figure 9:
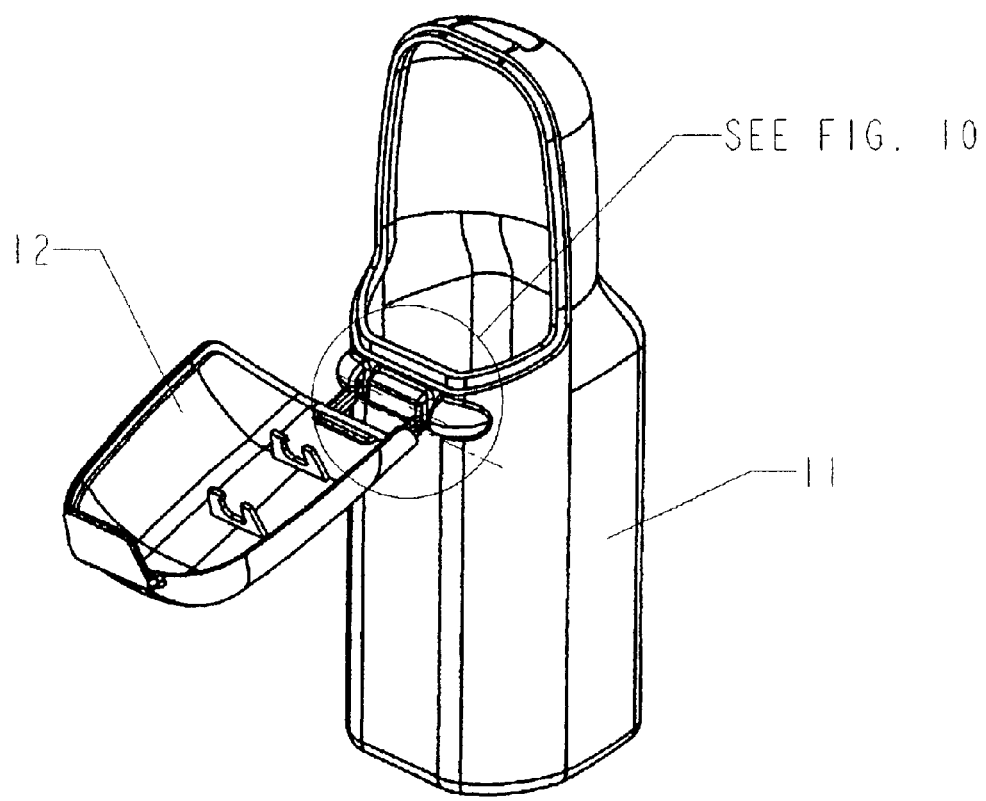
FIG. 9 is an exploded isometric view of the storage container. The container door is detached from the main housing.
Figure 10:
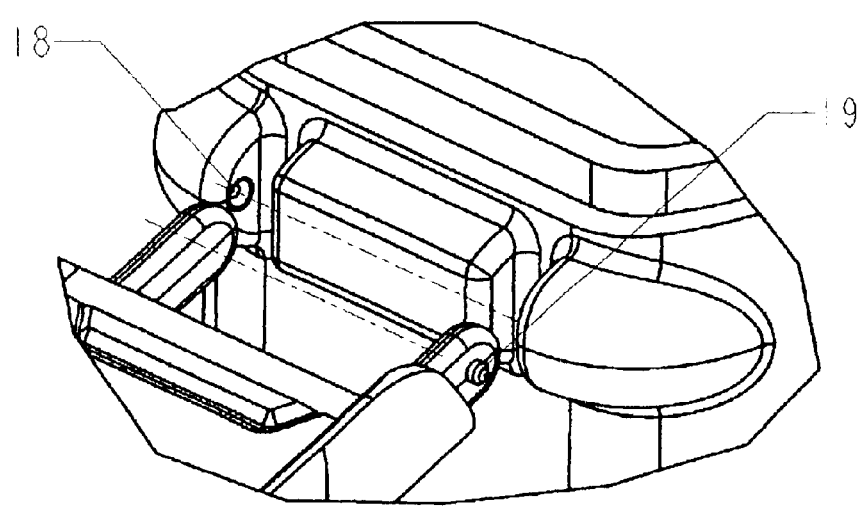
FIG. 10 is a detailed view of FIG. 9

FIG. 8 is a detailed view of the door hinge 13. The hinge pin 19 is a feature of the door 12. The hinge dimple 18 is a feature of the housing 11. FIG. 10 illustrates the door 12 detached from the housing 11. When the opposing hinge pins 19 are forced into radial alignment with the opposing hinge dimples 18, the hinge dimples 18 engage the hinge pin 19, thus creating a door hinge 13.

Figure 11:
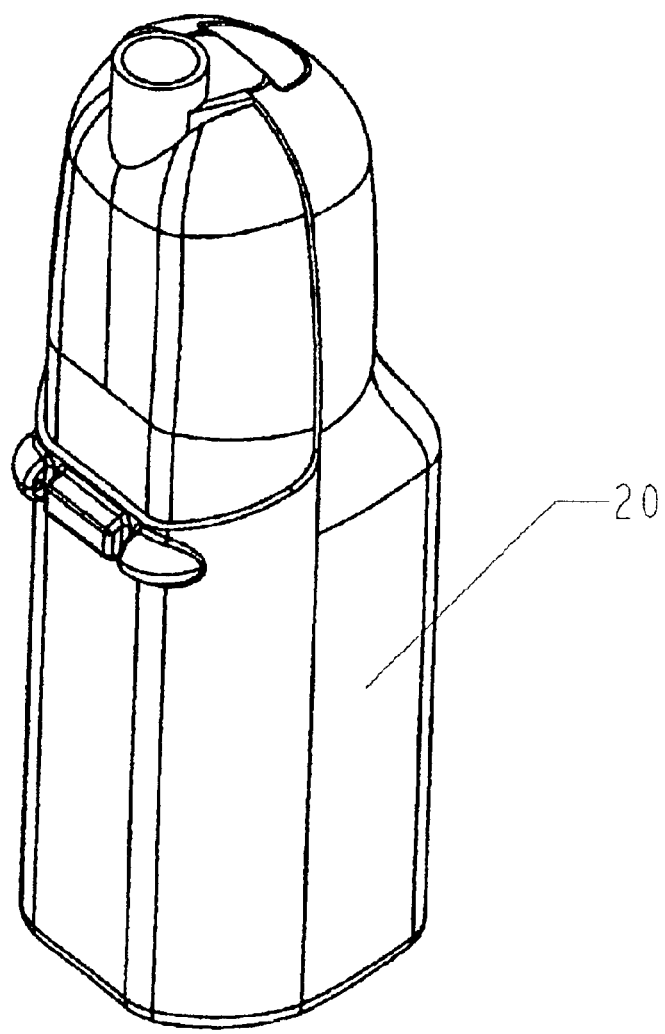
FIG. 11 is an isometric view of the container housing as it would appear after it has been blow molded, but prior to the secondary trimming operation.
Figure 12:
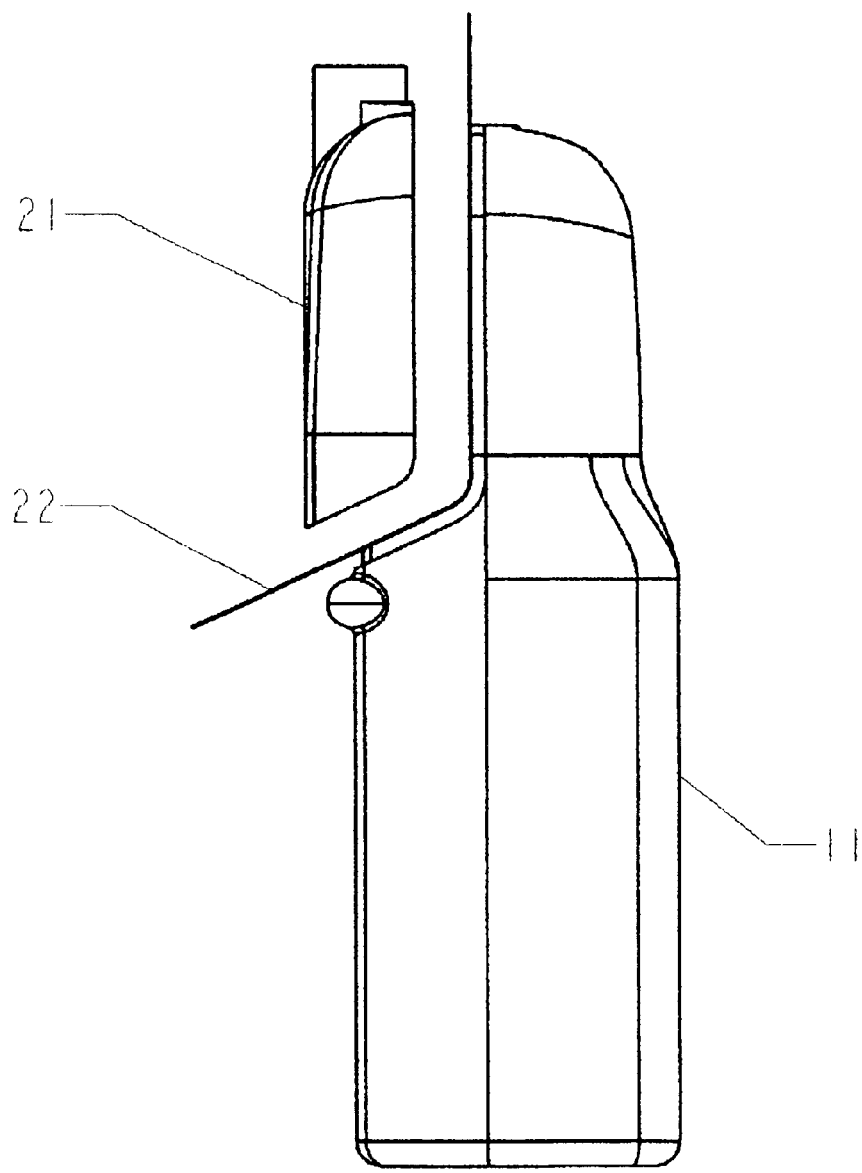
FIG. 12 is a side view of the trimmed material separated from the container housing after the trimming operation. The trimmed material is cut along the trimming line.
Figure 13:
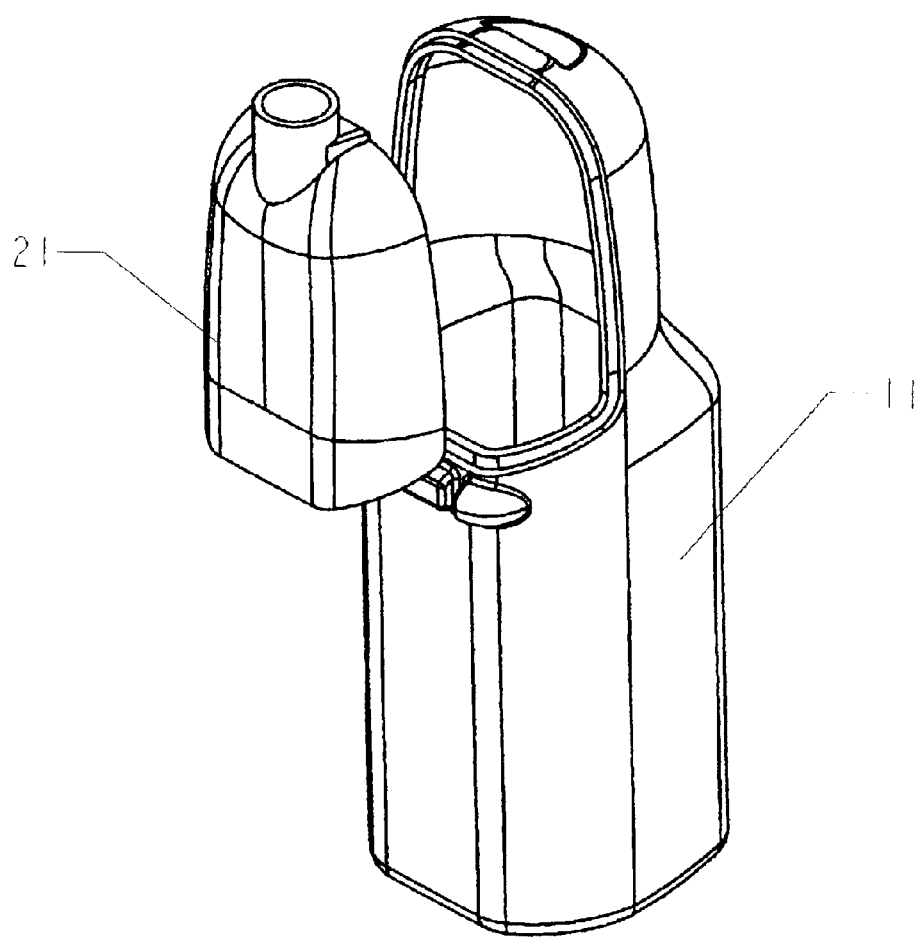
FIG. 13 is an isometric view of the trimmed material separated from the container housing after the trimming operation.

FIG. 11 is an illustration of an untrimmed blow molded housing 20. This is how the housing 20 would appear after it has been extrusion blow molded, but prior to the trimming operation in which the bottle neck and the surrounding area is removed. Extrusion blow molding is a commonly used procedure for producing plastic bottles. FIG. 12 illustrates the separation of the trimmed material 21 from the housing 11. The trimmed material 21 could then be discarded or recycled. The untrimmed housing 20 is trimmed along the trim line 22 shown in FIG. 12. FIG. 13 illustrates the housing 11 and the trimmed material 21 as two separate entities.

Figure 14:
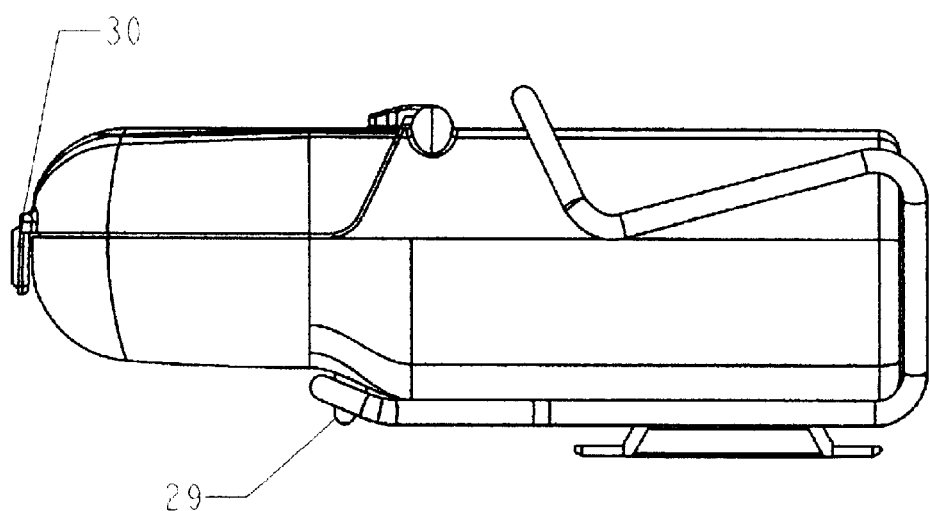
FIG. 14 is a side view of the security lock embodiment of the storage container.
Figure 15:
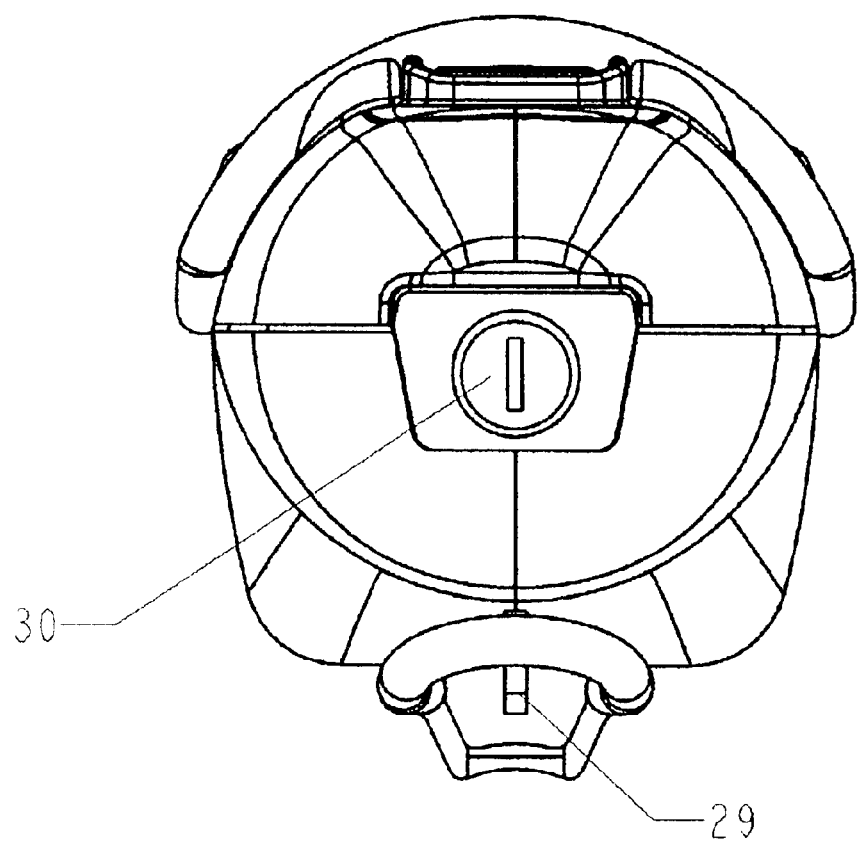
FIG. 15 is a front view of the security lock embodiment of the storage container.

FIG. 14 and FIG. 15 illustrate a locking mechanism 29 that locks the container 10 to the water bottle holder 15. The container locking mechanism 29 may be a key lock, combination lock, or other type of security locking mechanism. Since the container 10 covers the two bolts that are used to mount the holder 15, the container 10 is, in effect, secured to the object that the holder 15 is mounted to. FIG. 14 and FIG. 15 also illustrate the door locking mechanism 30. This is a locking feature such as a key lock, combination lock, or other type of security locking mechanism, which locks the door 12 closed, securing the contents inside.

FIG. 16 and FIG. 17 illustrate the door hinge 13 and door retention features 14 in alternative locations than previously shown. As previously described, the door 12 can be opened without removing the device 10 from the water bottle holder 15.

Another embodiment of the invention is illustrated in FIG. 18, FIG. 19, FIG. 20 and FIG. 21. This is the split housing embodiment. The door 25 is closed in FIG. 18. The housing retention features 27 keep the housing top 24 and housing bottom 23 together. In FIG. 19 the door 25 is open. The top housing 24 is released from the bottom housing 23 and is rotated partially open on the housing hinge 26. In FIG. 20 the housing top 24 is rotated completely open. This gives the user easier access to articles of the container. Accessory retention clips and partitions 28 on the interior wall of the top housing 24, bottom housing 23 and door 25 retain articles including, but not limited to tools, bicycle pumps, and patch kits.

Although the description above contains many specificities, these should not be construed as limiting the scope of the invention but as merely providing illustrations of some of the presently preferred embodiments of this invention.

Thus the scope of the invention should be determined by the appended claims and their equivalents, rather than by the examples given.

We claim:

1. A container in combination with a standard water bottle holder mounted to a member of a bicycle frame; said container comprising:
   (a) a hollow housing with an opening, said housing having a top end, a bottom end and a sidewall therebetween, said opening formed in a portion of the top end and the sidewall;
   (b) a door, which covers the housing opening,
   (c) a hinge, which fixes said door to the housing, and provides an axis about which said door can rotate open on;

said door can be opened without removal of the container from the water bottle holder and said hinge is located on the side of said housing which is opposite said member.

2. The container of claim 1, further including one or more retention features which retain said door in the closed position.

3. The container of claim 1, further including a means for locking the container to the water bottle holder.

4. The container of claim 1, further including a means for locking said door in the closed position.

5. The container of claim 1, wherein said hollow housing with an opening further comprising:
   a. a first part,
   b. a second part, which has surfaces that mate with said first part surfaces to form a sealed hollow housing with an opening,
   c. a hinge, which fixes said first part to said second part, and provides an axis about which said first part can rotate apart from said second part, wherein each of the first part and the second part form a portion of the bottom end and the sidewall of the housing.

6. The container of claim 5, further including one or more retention features which retain said first part in the closed position.

7. A container in combination with a standard water bottle holder mounted to a member of a bicycle frame; said container comprising:
   (a) a hollow housing with an opening, said housing having a top end, a bottom end and a sidewall therebetween, said opening formed in a portion of the top end and the sidewall;
   (b) a door, which covers the opening,
   (c) a hinge, which fixes said door to the housing, and provides an axis about which said door can rotate open on;

said door can rotate open to an angle equal to or greater than 90 degrees, without colliding with said housing, said bottle holder or said member and without removal of the container from the water bottle holder.

8. The container of claim 7, further including one or more retention features which retain said door in the closed position.

9. The container of claim 7, further including a means for locking the container to the water bottle holder.

10. The container of claim 7, further including a means for locking said door in the closed position.

11. The container of claim 7, wherein said hollow housing with an opening further comprising:
   a. a first part,
   b. a second part, which has surfaces that mate with said first part surfaces to form a sealed hollow housing with an opening, c. a hinge, which fixes said first part to said second part, and provides an axis about which said first part can rotate apart from said second part, wherein each of the first part and the second part form a portion of the bottom end and the sidewall of the housing.

12. The container of claim 11, further including one or more retention features which retain said first part in the closed position.

13. A container in combination with a standard water bottle holder mounted to a member of a bicycle frame; said container comprising:

(a) a hollow housing with an opening, said housing having a top end, a bottom end and a sidewall therebetween, said opening formed in a portion of the top end and the sidewall, (b) a door, which covers the housing opening, (c) a hinge, which fixes said door to the housing, and provides an axis about which said door can rotate open on;

said door can be opened without removal of the container from the water bottle holder and said door rotates open in a direction which is away from said member.

14. The container of claim 13, further including one or more retention features which retain said door in the closed position.

15. The container of claim 13, further including a means for locking the container to the water bottle holder.

16. The container of claim 13, further including a means for locking said door in the closed position.

17. The container of claim 13, wherein said hollow housing with an opening further comprising:

a. a first part, b. a second part, which has surfaces that mate with said first part surfaces to form a sealed hollow housing with an opening, c. a hinge, which fixes said first part to said second part, and provides an axis about which said first part can rotate apart from said second part, wherein each of the first part and the second part form a portion of the bottom end and the sidewall of the housing.

18. The container of claim 17, further including one or more retention features which retain said first part in the closed position.

* * * * *

UNITED STATES PATENT AND TRADEMARK OFFICE
CERTIFICATE OF CORRECTION

PATENT NO. : 6,837,407 B1
DATED : January 4, 2005
INVENTOR(S) : Christopher R. Towers and William P. Stiles It is certified that error appears in the above-identified patent and that said Letters Patent is hereby corrected as shown below:

Replace drawing sheets 1 and 2 with applicant's original drawing sheets 1, 2 and 3, which are attached to this document.

Signed and Sealed this

Seventeenth Day of May, 2005

JON W. DUDAS
*Director of the United States Patent and Trademark Office*